Sept. 27, 1932.    N. LOMBARD    1,879,365
VACUUM BRAKE
Filed Nov. 10, 1928    2 Sheets-Sheet 1
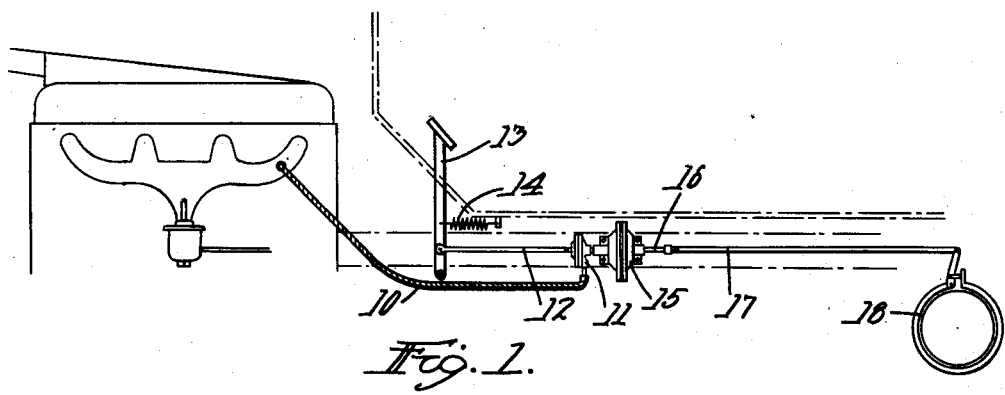
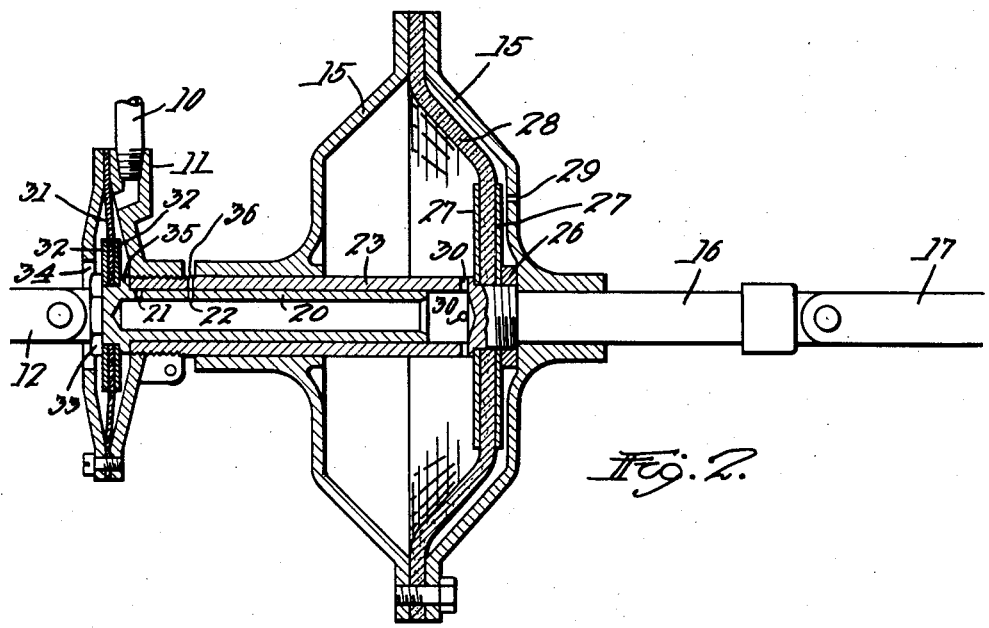

Sept. 27, 1932.  N. LOMBARD  1,879,365
VACUUM BRAKE
Filed Nov. 10, 1928   2 Sheets-Sheet 2

Patented Sept. 27, 1932

1,879,365

UNITED STATES PATENT OFFICE

NATHANIEL LOMBARD, OF WORCESTER, MASSACHUSETTS

VACUUM BRAKE

Application filed November 10, 1928. Serial No. 318,514.

This invention relates to a vacuum brake particu'rly designed for automobiles and the like, but capable of other applications.

The principal objects of the invention are to provide a simplified form of vacuum brake in which no tight fitting piston is employed; to provide a construction in which the action of the operator in applying the brake will be the same as employed in the ordinary brakes of the mechanical and air types, but in which the force required to apply it is very much reduced and while under suction there will always be a pull against the brake pedal; to provide a construction also in which if, for any reason the vacuum does not work, the brake will be applied mechanically without any change in the manner of operation, and in fact will be applied mechanically when the operator pushes the pedal down to its limit, and in which the parts are so connected that during the reciprocation they cannot get out of perfect alignment; and to provide a simple operating and simply constructed device for this purpose.

Other objects and advantages of the invention will appear hereinafter.

Reference is to be had to the accompanying drawings in which

Fig. 1 is a side view showing an engine and brake diagrammatically and illustrating the connection of a preferred form of this invention thereto;

Fig. 2 is a central sectional view of the vacuum brake operating device showing it in the "off" position;

Figure 3:
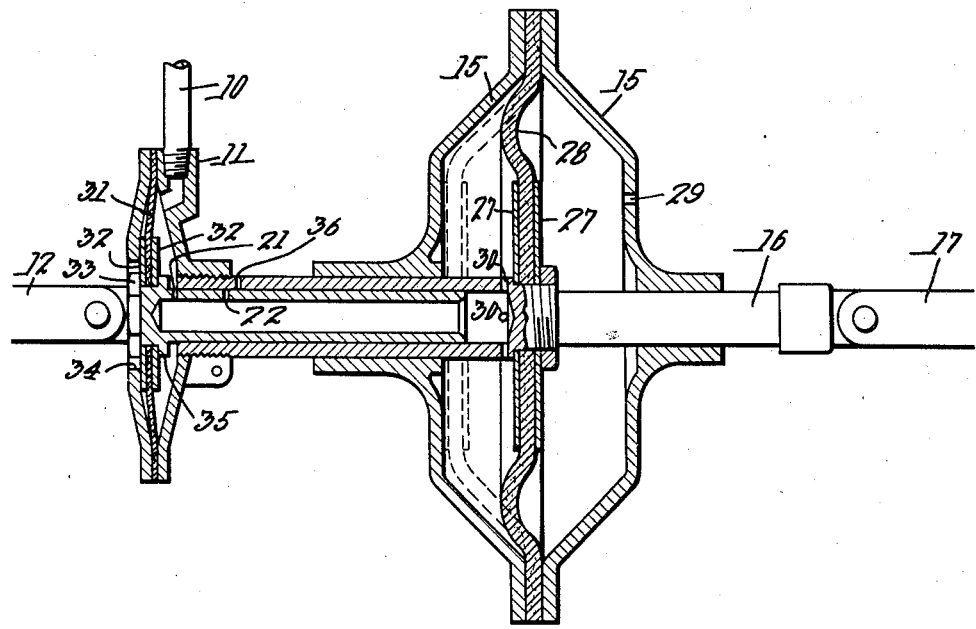
Fig. 3 is a similar view showing it in the working position.

As shown in Fig. 1, the brake operating means comprises a flexible hose or pipe 10 connected with the intake manifold, and thus with the suction, of the engine. This hose is connected with a casing 11, which constitutes a part of the brake operating mechanism and controls the connection of the suction with the operating part of the device, and to which is connected a link 12 operated by the ordinary foot pedal 13. The brake operating means comprises a diaphragm chamber 15 and a rod 16 to which is pivoted a brake operating link 17 which operates the brake 18 in the usual way. The chamber 15 is secured in fixed position.

The link 12 is pivotally connected with a hollow sliding valve 20. This is provided with two ports 21 and 22 through its wall. It is mounted in a cylinder 23, which is rigidly connected to the end of the rod 16 and in fact integrally mounted on it, as shown. On this rod is a screw-thread on which a nut 26 screws to bind two plates 27 on opposite sides of a flexible diaphragm 28. This diaphragm is located in the diaphragm chamber 15 and clamped between its two halves. This chamber has a port 29 to the outside air on one side of the diaphragm and is closed on the other. The piston valve 20 is provided with a longitudinal passage which communicates with the two ports 21 and 22 and is open at its inner end, so that this passage communicates with the interior of the diaphragm chamber 15 on its closed side through one or more ports 30 through the wall of the cylinder 23.

At the end of the valve 20 is secured another diaphragm 31 by means of plates 32 on its opposite sides and a nut 33 screwing on it. This diaphragm is located in the casing 11 which has a port 34 through which it is open to the air on one side and is closed on the other, but, on this other side, is connected with the pipe or hose 10 so as to connect it with the suction.

It will be seen that the valve 20 is provided with a collar 35 integral therewith, as shown, which comes up against the end of the cylinder 23 which screws into a hub on one side of the casing 11. This limits the positions of these parts in one direction. In the other direction this piston is limited by one of the plates 32 engaging the opposite wall of the casing 11, as shown in Fig. 3.

It will be seen that the ports 30 communicate with the interior of the diaphragm casing 15 at all times; that the ports 29 and 34 are always open, and that the port 22 is open or closed in accordance with its registration with a port 36 through the cylinder 23. The port 21 is closed in the position shown in Fig. 2, but opened when the diaphragm 31 moves to its limiting left hand position, as shown in Fig. 3.

The position shown in Fig. 2 is the position assumed when the parts are at rest. When it is desired to apply the brake, the pedal is pushed in the ordinary way and, being pivoted as shown, pulls the rod 12 to the left. The effect of this is to bring the port 21 into communication with the interior of the casing 11 and allow the suction to draw the air out of the interior of the valve 20 and the left hand side of the diaphragm chamber 15. Thus, instead of the rod 20 pulling the brake, the air pressure on the right hand side of the large diaphragm 28 is allowed to push the brake rod 16 and the link 17 to the left, in the same direction. It will be seen that if for any reason the suction should not work, the device operates as a direct mechanically operated brake and therefore the operator cannot lose control of it through any failure of the suction.

The ordinary operation is shown by comparison of Figs. 2 and 3 and it will be seen that the diaphragm 28, being forced over to the left by the air pressure on the other side, operates the brake. The two ports 22 and 36 are brought out of registration and there is no leakage. When the operator lets up on the pedal, the suction in the casing 11 draws the diaphragm 31 back, or rather the air pressure on the other side forces it back, and closes the port 21. The ports 22 and 36 now come into registration and the whole device is vented. The air enters through these ports and the ports 30 to restore the device to the original condition shown in Fig. 2, because the suction on the diaphragm 31 pulls the casing 11 back and thus forces the diaphragm 28 over. An important feature is the constant resistance on the treadle disc to the suction on one side of the diaphragm 31. Material pressure has to be applied to the treadle to operate the device.

This is a simple acting device, non-leaking and having few parts subject to wear; it is all contained in two air-tight casings, and the mechanical connection is not lost even if for any reason the brake should have to be applied when the engine is not working and the suction is not available.

Figure 4:
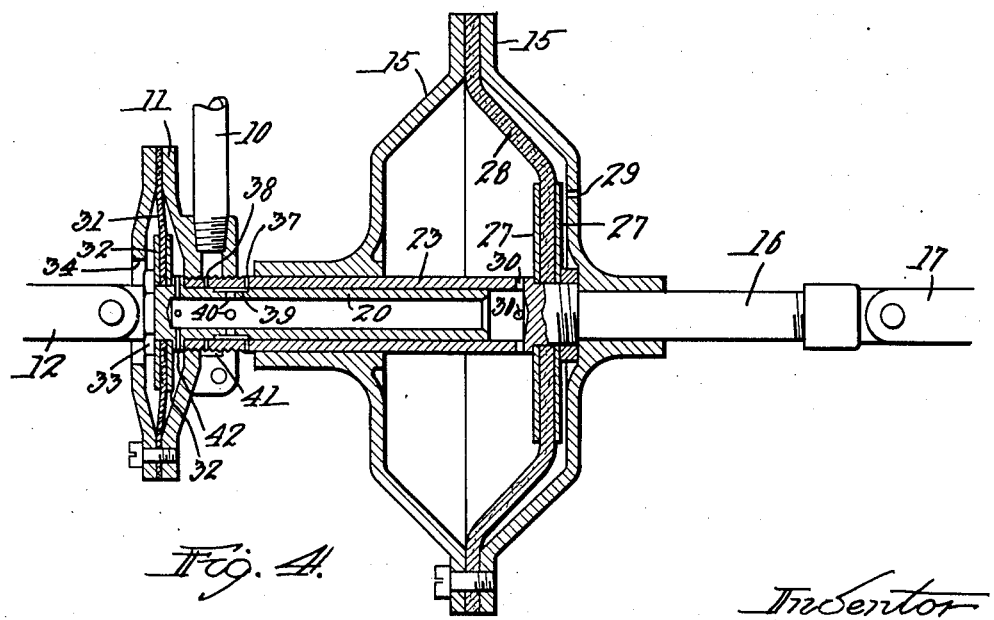
Fig. 4 is a view similar to Fig. 2 showing a modification.

In the form shown in Fig. 4 most of the conditions above mentioned are present and the same reference numerals are applied to show the parts that are identical. However, the cylinder 23 in this case is provided with two ports 37 and 38 and the valve 20 is provided with a circumferential recess 39 which communicates with the interior thereof through ports 40. In this case the treadle operates without resistance at first; but after suction is admitted resistance builds up in the casing 11 in proportion to that in the chamber 15. In both cases this resistance is desired so that the operator will feel the increased suction.

In the normal inactive condition shown in Fig. 4 the port 37 communicates with the port 40 in the same way and for the same purpose as the ports 36 and 22 communicate with each other in Fig. 2. The port 38 is cut off from communication with the interior of the piston valve 20 but it communicates with the suction through the pipe 10 which enters the casing 11 and communicates with a recess 41 therein, independent of the chamber in which the diaphragm 31 is located.

It will be noted that at the end of the space in the valve 20 there are ports 42 communicating at all times with the right-hand side of the casing 11 so that when the suction is on in the device, the diaphragm 31 will be moved over to the right by the air pressure behind it. Then it will be vented when the parts are moved back to the position shown in Fig. 4 so that there will be atmospheric pressure at that time on both sides of the diaphragm 31. It will afford no resistance to the operation of the rod 12.

When the rod 12 is pulled to the left it brings the valve 20 over and the space 39 out of communication with the port 37 and into communication with the port 38. This provides substantially the same action as in the other case.

The device in either form is very simple. It has no piston to be oiled and kept in order and no parts that might stick and prevent its operation. The sliding surfaces are inside the cylinder 23 where they are protected from air and moisture except the slight sliding of the brake rod 16 in the chamber 15. The operator does not have to learn any new motions. In case of emergency, he does exactly what he would do with the types of brakes now on the market.

In normal operation of the brake in the usual way, it cannot get him in any difficulties and prevent the operation of the brake even if it is applied when there is no suction or if for any reason the suction pipes should be broken, the brake would still be operative as a straight mechanical brake.

Although I have illustrated and described only two forms of the invention I am aware of the fact that other modifications can be made therein by any person skilled in the art without departing from the scope of the invention as expressed in the claims. Therefore I do not wish to be limited in this respect but what I do claim is:—

1. In a vacuum brake, the combination with a brake and an internal combustion engine, of a casing connected with the intake of the engine, a brake pedal, a link connected with the brake pedal, a valve connected with said link, a diaphragm in said casing to the center of which said valve is connected, the suction being connected with one side of the diaphragm and the other being open to the air, whereby, when the pedal is actuated the suction of the engine holds the diaphragm in a certain position as far to one side as it will go, said diaphragm being so arranged in the casing as to allow connection of the interior of the casing with the intake at all times, irrespective of the position of the diaphragm and valve, said valve having a port adapted to be exposed to the suction when the brake pedal is moved to displace the diaphragm, and means operated by the suction for applying the brake.

2. In a vacuum operating means for a brake, the combination with the brake and its brake rod, said brake rod being hollow at its end, of a valve slidable located within the hollow part of the brake rod and having two ports therethrough, the hollow part of the brake rod having ports, a diaphragm chamber mounted in fixed position, and a diaphragm in said chamber positively connected to the brake rod and located at one side of the ports through the brake rod, the other side of the diaphragm chamber being open to the air, said hollow part of the brake rod having a port through its wall normally communicating with one of the ports in the valve therein to admit air to the other side of the diaphragm, the other port in the valve being located where it will communicate with the suction of the engine when this valve is moved slightly to one side, whereby the suction will communicate through the valve into the closed side of the diaphragm chamber and the diaphragm will move by the air pressure on the other side to apply the brake.

3. In a vacuum operating means for a brake, the combination with the brake and its brake rod, said brake rod being hollow at its end, of a valve slidably located within the hollow part of the brake rod and having two ports therethrough, the hollow part of the brake rod having ports, a diaphragm chamber fixedly mounted, a diaphragm in said chamber positively connected to the brake rod and located at one side of the ports through the brake rod, the other side of the diaphragm chamber being open to the air, said hollow part of the brake rod constituting a cylinder and having a port therethrough normally communicating with one of the ports in the valve to admit air to the other side of the diaphragm, the other port in the valve being located where it will communicate with the suction of the engine when this valve is moved slightly to one side, whereby the suction will communicate through the valve into the closed side of the diaphragm chamber and the diaphragm will move by the air pressure on the other side to apply the brake, the first named port in the valve being displaced from the port in the cylinder to cut off the air at the same time.

4. In a vacuum operating means for a brake, the combination with the brake and its brake rod, said brake rod being hollow at its end, of a valve slidably located within the hollow part of the brake rod and having two ports therethrough, the hollow part of the brake rod having ports, a chamber and means for operating the brake in said chamber, and located at one side of the ports through the brake rod, said hollow part of the brake rod having a port through its wall normally communicating with one of the ports in the valve therein, the other port in the valve being located where it will communicate with the suction of the engine when this valve is moved slightly to one side, whereby the suction will communicate through the valve into said chamber.

In testimony whereof I have hereunto affixed my signature.

NATHANIEL LOMBARD.